United States Patent Office 3,294,709
Patented Dec. 27, 1966

3,294,709
COATING AGENTS
Siegfried Nitzsche, Ewald Pirson, and Michael Roth, Burghausen, Bavaria, Germany, assignors to Wacker-Chemie G.m.b.H., Munich, Bavaria, Germany
No Drawing. Filed Oct. 7, 1964, Ser. No. 402,333
Claims priority, application Germany, Oct. 16, 1963, W 35,443
3 Claims. (Cl. 260—23)

This application relates to a novel protective coating or paint based on organosiloxane polymers and organic resins.

The addition of small amounts of organosiloxane resins to water based paints utilizing organic resins is well known. The water resistance of the organic resin film is somewhat improved by the presence of the organosiloxane polymer but such improvement is marginal.

The use of mixtures of organic resins and water dispersible organosiloxane polymers for hydrophobizing masonry and other cementitious materials is also known. The organic resin is employed to protect the organosiloxane from the effect of the free lime on the cementitious surface. However, the use of organosiloxane resin-organic resin mixtures wherein the organic resin is not the major ingredient and/or wherein pigments are employed has not been known.

It is an object of the present invention to introduce a new paint. A water-based coating composition of general utility is also an object of this invention. A further object is a novel composition of matter particularly useful as a protective coating for a wide variety of materials and particularly for brick walls, concrete, mortar based on lime and sand, plastered masonry, natural stone and other silicate building materials. Other objects and advantages of this invention are detailed in or will be apparent from the disclosure and claims following.

This invention comprises an aqueous dispersion of (a) a resinous organosiloxane polymer, (b) an organic resin and/or an organic drying oil in amount not exceeding the siloxane (a), and (c) 0.1 to 15% by weight based on the total weight of (a) and (b) of at least one alkali metal salt of a silane or of a siloxane.

The organosiloxane resins employed herein as ingredient (a) are known polymeric materials prepared by methods well known in the art. These siloxane resins are polymers made up of units selected from $SiO_{4/2}$, $RSiO_{3/2}$, $R_2SiO$ and $R_3SiO_{1/2}$ units wherein the average ratio of R/Si is in the range of 0.9/1 to 1.7/1 and R represents a monovalent hydrocarbon radical bonded to silicon through a C—Si linkage. The radicals represented by R can be alkyl such as methyl, ethyl, propyl, nonyl and octadecyl; cycloalkyl such as cyclobutyl and cyclooctyl; alkenyl such as vinyl, allyl, butenyl and octadecenyl; cycloalkenyl such as cyclobutenyl and cyclooctenyl; aryl such as phenyl, diphenyl and anthracyl; aralkyl such as benzyl and phenylethyl; and alkaryl such as tolyl, xylyl, ethylphenyl and methylnaphthyl. The best known commercial siloxane resins are based on polymeric units wherein each R contains 1-6 carbon atoms such as methyl, ethyl, vinyl and phenyl and the most preferred siloxane resins are the methylsiloxanes and methylphenylsiloxanes. Particularly useful are siloxane resins of the general unit formula

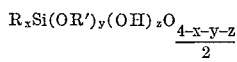

where R is as defined above, R' is an alkyl radical of 1-4 carbon atoms, $x$, $y$ and $z$ are each 0, 1, 2 or 3, the sum of $x+y+z$ being not greater than 3 and the average value of $x=0.9–1.7$, the average value of $y=0.01$ to 0.1, and the average value of $z$ does not exceed 0.1. These siloxane resins should not contain more than 25 mol percent of diorgano- and triorganosiloxane units and should have a molecular size such that in their solvent free state their viscosity does not exceed 250,000 cs. at 25° C. with best results achieved with siloxane resins having a solvent-free viscosity not exceeding 120,000 cs. at 25° C.

The method employed to prepare the siloxane resin is not critical and any of the methods well known in the art can be employed. The organic resin which constitutes ingredient (b) herein can be any natural or synthetic water-dispersible organic resin whose aqueous mixtures will dry to form a water-insoluble film. Preferred are those organic resins which are commonly used in emulsion or dispersion paints, especially emulsion or suspension-polymerizates or copolymerizates from monomers containing one or more alphatic double bonds and the water insoluble resins prepared from such polymerizates.

The organic resin polymers can be prepared from monomers such as vinyl esters of saturated monocarboxylic acids such as vinyl acetate, vinylchloroacetate, vinyl propionate, vinyl laurate and vinylstearate; vinyl halides and vinylidene halides such as vinyl chloride and vinylidene chloride; styrene and its derivatives such as vinyl toluene and α-methylstyrene; olefins such as ethylene, propylene, isobutylene and butadiene; vinyl ethers such as vinylethyl ether, acrylonitrile, acrylic and methacrylic esters such as methyl acrylate, ethyl acrylate, methyl methacrylate and butyl acrylate; unsaturated dicarboxylic acids such as maleic acid, fumaric acid, methylene malonic acid, itaconic acid, citraconic acid and tetrahydrophthalic acid as well as mono- and di-esters of these acids such as dimethyl-, diethyl- and di-n-butyl esters of maleic acid, non-(2-ethylhexyl) ester of maleic acid, dimethyl-, diethyl- and di-n-butyl-di(2-ethylhexyl)-, and di-lauryl esters of fumaric acid. Also operative and of particular interest herein are polymerizates of polyvinyl acetals such as polyvinylformal and polyvinylbutyral. Particularly preferred are polymerizates and copolymerizates of vinylacetate, vinylethylether and ethylacrylate.

Other organic resins which are operable herein are alkyd resins, phthalate resins, epoxy resins and rosin and modified rosins.

Vegetable drying oils which can be employed in conjunction with or in place of the organic resins defined above include soybean oil and linseed oil as well as epoxidized derivatives thereof.

The organosiloxane resin (a) should be present in amount of from 50 to 95% by weight and the organic resin and/or oil (b) should be present in amount of from 5 to 50% by weight based on the total weight of (a) and (b).

The third ingredient herein is (c) an alkali metal salt of certain organosilicon monomers and polymers. The alkali metal salts contain any desired alkali metal selected from lithium, sodium, potassium, rubidium and cesium but the preferred salts are sodium salts. The salts can contain 1–4 alkali metal atom per silicon atom. The salts can be monomeric materials of the general formula $R_aSi(OM)_{4-a}$ where R is as above defined, M is an alkali metal atom or hydrogen, at least one M per Si being an alkli metal atom and $a$ is 0 or 1. The operative salts can also be polymeric materials containing units of the formulae $R_a(MO)_{3-a}SiO_{1/2}$ and $R_a(MO)_{2-a}SiO$ where R, M and $a$ are as above defined and the alkali metal atom/Si ratio is at least 1/1. Mixtures of salts are operable. It is preferred that R be —$CH_3$ in these salts.

Alkali metal salts of organosilanols having silcarbane bonds such as methylene, ethylene or phenylene groups linking silicon atoms can be present in the alkali metal salts used herein. Thus, one can employ alkali metal salts prepared by (1) hydrolysis of the distillation residue obtained from the reaction of methyl chloride and silicon (known in the art as direct process residue or DPR), followed by (2) reaction of the silanol obtained in (1) with an alkali metal hydroxide in the known manner. The most preferred salt (c) is sodium methyl siliconate.

The alkali metal salt is employed in amount of from 0.1 to 15 percent by weight calculated on the total weight of siloxane resin (a) and organic film former (b) present in the composition. It is preferred to employ sufficient alkali metal salt (c) to give the aqueous system a pH above 7.0.

One considerable advantage of the coating materials of the present discovery resides in that they can take on a very high pigment content, without chalking. The weight ratio of pigment to the total quantity of organopolysiloxane and organic resin and resin forming oil can be as high as 15:1, preferably it is 3:1 to 8:1. It is thus possible to prepare coatings with a large covering range with the help of the materials of the present discovery. Any pigments commonly used in coating materials can also be employed within the framework of the present discovery. Examples of operable pigments are titanium dioxide, talcum, chalk, precipitated calcium carbonate, satin-white (calcium-aluminum-sulfate) barite, iron oxide, chromium oxide, dolomite, malachite green, and carbon black which should be in the form of powders. Pure pigments or mixtures of pigments can be used.

Coatings of the present discovery can be prepared in any desired manner. Preferably it is done by dissolving the organopolysiloxane (a) and organic resin or resin-forming oils (b) in a normally fluid solvent commonly used for such resins and then emulsifying the solutions, if desired with the addition of a dispersing agent, in water by any of the well known methods. Examples of solvents are hydrocarbons such as toluene, chlorohydrocarbons such as trichloroethylene; ethers such as di-n-butylether; alcohols such as ethyl alcohols; and ketones, such as methyl ethyl ketones. Examples of dispersing agents are protective colloids, such as polyvinyl alcohol which contains up to 40 mol percent of residual acetyl groups, gelatines and cellulose derivatives, such as water-soluble methyl cellulose; anion active emulsifiers such as alkali metal salts and ammonium salts of fatty acids, organic sulfonic acids or acidic sulfuric acid ester, such as sodium laurate, sodium- isopropyl-naphthalinesulfonate, triethanol-ammonium oleate and lauryl alcohol sulfonate; cation active emulsifiers such as stearyl ammonium chloride and non-ionic emulsifiers, such as sorbitolmonolaurate, and polyoxyethylene ether of fatty alcohols or aromatic hydroxy compounds. The dispersing agents are most effectively used in quantities of 0.1 to 5% calculated on the total weight of organopolysiloxane and organic resin and resin-forming oil. The preferred dispersing materials are partially acetylated polyvinyl alcohol and polyovyethylene ether of fatty alcohols. The dispersion prepared as described above is then mixed with an aqueous solution of the alkali metal salt (c) after first thoroughly mixing with an aqueous slurry of the pigment or pigments. If desired, the organic resins or the resin forming oils can also be incorporated in solvent-free form, for example, in the form of their commercial dispersions or redispersible powders during the preparation of the coating materials of the present discovery. The same is true for the organopolysiloxanes. The salts also can be used in dry form.

In addition to the above components, the coating materials of the present discovery can, of course, contain other additives which are common in coating materials such as thickening agents, cutting agents (extenders) for pigments, insecticides, materials protecting against light, water soluble dyes, sedimentation inhibitors, and softeners as well as condensation catalysts for the organopolysiloxane resins.

The water content of the dispersions is that which is common for coating materials; it can be 20–100%, preferably 30–65% calculated on the total weight of the remaining components given above.

The coating material of the present discovery can be used for indoor and outdoor painting, on wood, metals such as iron, but especially on brick walls, concrete, with mortar based on lime and sand, plastered masonry, natural stone and other silicate building materials. It can be applied in any desired manner, for instance, by brushing, spraying or dipping.

It may often be of advantage to prime the surfaces which are to be painted with organosilicon compounds known to be hydrophobizing agents, for instance, with sodium methyl siliconate in the form of aqueous solutions or dispersions, or also dissolved in organic solvents before applying the coatings of the present discovery.

The coatings of the present discovery yield unsmudging and chalking-resistant films having a high water repellency and weathering resistance as well as excellent air and water vapor permeability. In spite of the high content of organic components the coatings are not attacked by microorganisms.

The following examples are included herein to assist those skilled in the art in understanding and practising this invention. The invention is not limited in scope by the examples but is properly delineated by the claims.

*Example 1*

500 g. of a solution of 225 g. of an organopolysiloxane of 80 mol percent monomethylsiloxane units and 20 mol percent dimethylsiloxane units having 8 percent by weight ethoxy groups and 6 percent by weight of Si-bonded hydroxyl groups and 25 g. of low-viscosity polyvinylethylether with a K-value (cf. Cellulosechemie, vol. 13, p. 58) of about 25 in 250 g. toluene are emulsified in a solution of 10 g. polyvinyl alcohol with an acetyl group content, equalling a saponification count of about 140, and a K-value of about 70 in 490 g. water.

280 g. of the emulsion thus obtained having a total resin content of 25% by weight were added to a slurry of 280 g. of a commercial titanium dioxide pigment, 80 g. chalk, 80 g. talcum, and 30 g. red iron oxide in 140 g. water. This dispersion was then mixed with 15 g. of a 30 weight percent aqueous solution of sodium methyl siliconate (Na:Si ratio=1) and thoroughly stirred.

The coating material thus obtained was brushed onto mortar samples which had been primed with a 0.6% by weight aqueous solution of sodium methyl siliconate (Na:Si=1) as well as onto a glass plate. 20 days after the application the absorption of the coating was tested by measuring the rate of penetration of 0.5 ml. water which was dropped onto the coating.

Rate of penetration in minutes
(average values of five measurements)
Uncoated mortar _____ 0.5
Coated mortar _____ [1] 546.0
Glass plate _____ [1] 520.0

[1] After the times given here the test was discontinued since the water had evaporated without wetting the film and penetrating same.

A dry and wet chalking could not be observed.

In order to determine the water vapor permeability, mortar samples were fitted into containers as sealing plates in which a relative atmospheric humidity of 2% by weight/15° C. was set up by means of a drying agent beneath the plates. The containers were placed in an area kept at 15° C. with constant relative atmospheric humidity of 50% by weight. As a result of the difference in water vapor pressures on the two sides of the sealing plates, a diffusion stream set in which was proportional to the water vapor permeability of the plate. Its magnitude was determined by the increase in weight of the siccative. The water vapor permeability of the mortar samples was determined before and after priming and coating in this manner. It was found that the air and water vapor permeability is at most reduced by 1% of the original permeability.

*Example 2*

1000 g. of a solution of 450 g. of the organopolysiloxane described in Example 1 and 50 g. of poly-n-butyl acrylate with a K-value of 25–500 g. toluene were emulsified in a solution of 20 g. of the polyvinyl alcohol described in Example 1 in 980 g. water.

400 g. of the emulsion thus obtained with a total resin content of 25% by weight were added to a slurry of 360 g. titanium white, 100 g. talcum, 60 g. dolomite flour, 65 g. chalk, and 15 g. chrome oxide green in 200 g. water.

This dispersion was then mixed with 25 g. of a 30% by weight aqueous solution of sodium methyl siliconate (Na:Si=1) and thoroughly stirred.

The tests with this coating material were carried out as in Example 1 with primed mortar samples. The results were practically the same as those of Example 1.

*Example 3*

500 g. of a solution of 250 g. of the organopolysiloxane described in Example 1 in 250 g. toluene were emulsified with 10 g. of a commercially obtainable emulsifier of nonylphenolpolyoxyethyleneether in 490 g. of water.

204 g. of the emulsion thus obtained having an organopolysiloxane content of 25% by weight as well as 18 g. of a 50% by weight aqueous dispersion of a polyvinyl acetate softened by copolymerization with 25% by weight vinyl laurate, having a K-value of 60, which contains about 1% by weight hydroxy ethylcellulose as emulsifier were added to a slurry of 360 g. of pigment mixture described in Example 2 in 110 g. of water and mixed in a ball mill for 12 hours. The dispersion thus obtained was then mixed with 7 g. of a 30% by weight aqueous solution of sodium methyl siliconate (Na:Si=1).

The tests with the coated materials thus obtained were carried out as described in Example 1 except that the measurements were taken not after 20 but rather after 28 days. The results were practically the same as those of Example 1.

*Example 4*

160 g. of a mixture of 64 g. of the organopolysiloxane described in Example 1 and 16 g. epoxidized soybean oil in 80 g. toluene were emulsified in a solution of 3.2 g. of the polyvinyl alcohol described in Example 1 and 157 g. of water.

The emulsion thus obtained (320 g.) with an organopolysiloxane/oil content of 25% by weight was mixed with a slurry of 290 g. titanium dioxide, 40 g. talcum, 50 g. dolomite flour, 19 g. barite and 1 g. carbon black in 160 g. water, mixed with 3 g. sodium silicate in the form of a water glass solution at about 35° Bé. and thoroughly stirred.

The tests of the coating material thus obtained were carried out as described in Example 3. The results were practically the same as those of Example 1.

That which is claimed is:

1. A composition suitable for use as a water base paint consisting essentially of an aqueous system containing (a) 50 to 95% by weight of a resinous organosiloxane polymer of the general unit formula

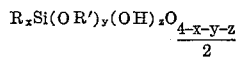

wherein each R is a monovalent hydrocarbon radical, each R' is an alkyl radical of one to four carbon atoms inclusive, $x$, $y$ and $z$ each have a value of from 0 to 3 inclusive, the sum of $x+y+z$ does not exceed 3, the average value of $x$ is in the range from 0.9 to 1.7, the average value of $y$ is in the range from 0.01 to 0.1 and the average value of $z$ does not exceed 0.1, (b) 5 to 50% by weight of a film forming material selected from the group consisting of organic resin polymers prepared from monomers selected from vinyl esters of saturated monocarboxylic, vinyl ethers, acrylic and methacrylic esters, and acrylonitrile and vegetable drying oils and mixtures thereof and (c) 0.1 to 15% by weight based on the total weight of (a) and (b) of at least one alkali metal salt of a silicon containing material selected from the group consisting of silanes and siloxane polymers.

2. A composition in accordance with claim 1 wherein the alkali metal salt (c) is a monomeric material of the formula $R_aSi(OM)_{4-a}$ where $a$ is 0 or 1, R is a monovalent hydrocarbon radical, and M is selected from the group consisting of alkali metal atoms and hydrogen atoms, at least one M per Si being an alkali metal atom.

3. A composition in accordance with claim 1 wherein the alkali metal salt (c) is a polymeric material of units of the formulae selected from the group consisting of $R_a(MO)_{3-a}SiO_{1/2}$ and $R_a(MO)_{2-a}SiO$ where $a$ is 0 or 1, R is a monovalent hydrocarbon radical and M is selected from the group consisting of alkali metal atoms and hydrogen atoms, at least one M per Si being an alkali metal atom.

References Cited by the Examiner

UNITED STATES PATENTS 2,588,828   3/1952   Greiner _____ 117—123
3,027,291   3/1962   Foster et al. _____ 260—29.2 X
3,087,902   4/1963   Teja _____ 260—4

OTHER REFERENCES

"Silikone in Bautenschutz," Pirson, Kunststoffe, Bd. 47, Heft 10, 1957, pp. 597–600.

LEON J. BERCOVITZ, *Primary Examiner.*

C. W. IVY, *Assistant Examiner.*